US007467408B1

United States Patent
O'Toole, Jr.

(10) Patent No.: US 7,467,408 B1
(45) Date of Patent: Dec. 16, 2008

(54) METHOD AND APPARATUS FOR CAPTURING AND FILTERING DATAGRAMS FOR NETWORK SECURITY MONITORING

(75) Inventor: James W. O'Toole, Jr., Somerville, MA (US)

(73) Assignee: Cisco Technology, Inc., San Jose, CA (US)

( * ) Notice: Subject to any disclaimer, the term of this patent is extended or adjusted under 35 U.S.C. 154(b) by 755 days.

(21) Appl. No.: 10/237,519

(22) Filed: Sep. 9, 2002

(51) Int. Cl.
*G06F 11/34* (2006.01)
*G06F 15/16* (2006.01)
*G08B 23/00* (2006.01)

(52) U.S. Cl. .................... 726/22; 726/13; 726/23; 726/24

(58) Field of Classification Search .............. 726/13, 726/22–24
See application file for complete search history.

(56) References Cited

U.S. PATENT DOCUMENTS

| 5,490,252 | A | | 2/1996 | Macera et al. ......... 395/200.01 |
| 5,606,668 | A | * | 2/1997 | Shwed ........................ 726/13 |
| 5,682,479 | A | * | 10/1997 | Newhall et al. ............. 709/242 |
| 5,796,942 | A | * | 8/1998 | Esbensen ..................... 726/13 |
| 5,991,881 | A | * | 11/1999 | Conklin et al. ................ 726/22 |
| 6,006,264 | A | | 12/1999 | Colby et al. ................. 709/226 |
| 6,137,782 | A | * | 10/2000 | Sharon et al. ................ 370/255 |
| 6,189,044 | B1 | * | 2/2001 | Thomson et al. ............ 709/242 |
| 6,292,832 | B1 | | 9/2001 | Shah et al. .................. 709/226 |
| 6,339,595 | B1 | | 1/2002 | Rekhter et al. .............. 370/392 |
| 6,351,465 | B1 | | 2/2002 | Han .............................. 370/395 |
| 6,363,489 | B1 | * | 3/2002 | Comay et al. ................. 726/22 |
| 6,466,976 | B1 | | 10/2002 | Alles et al. .................. 709/224 |
| 6,622,019 | B1 | * | 9/2003 | Shalem et al. ............... 455/445 |
| 6,931,452 | B1 | * | 8/2005 | Lamberton et al. .......... 709/242 |
| 7,047,303 | B2 | * | 5/2006 | Lingafelt et al. ............ 709/229 |
| 7,058,974 | B1 | * | 6/2006 | Maher et al. .................. 726/13 |
| 7,120,931 | B1 | * | 10/2006 | Cheriton ....................... 726/13 |
| 7,137,144 | B1 | * | 11/2006 | Attwood et al. .............. 726/13 |
| 7,137,145 | B2 | * | 11/2006 | Gleichauf ..................... 726/24 |
| 7,171,688 | B2 | * | 1/2007 | Boom .......................... 726/22 |
| 7,360,245 | B1 | * | 4/2008 | Ramachandran et al. ...... 726/13 |
| 2001/0030970 | A1 | * | 10/2001 | Wiryaman et al. ........... 370/401 |
| 2002/0018449 | A1 | * | 2/2002 | Ricciulli ..................... 370/268 |
| 2002/0083175 | A1 | * | 6/2002 | Afek et al. ................... 709/225 |
| 2002/0087882 | A1 | * | 7/2002 | Schneier et al. ............. 713/201 |
| 2002/0107953 | A1 | * | 8/2002 | Ontiveros et al. ............ 709/224 |
| 2002/0165980 | A1 | * | 11/2002 | Brown ......................... 709/242 |
| 2003/0051057 | A1 | * | 3/2003 | Garnett et al. ............... 709/249 |

(Continued)

OTHER PUBLICATIONS

Liston, Tom. "LaBrea—The Tarpit" (Nov. 2001) Archive.org cache. http://web.archive.org/web/20020604192039/http://www.hackbusters.net/LaBrea/.*

(Continued)

*Primary Examiner*—Ayaz Sheikh
*Assistant Examiner*—Matthew T Henning
(74) *Attorney, Agent, or Firm*—BainwoodHuang

(57) ABSTRACT

A method and system for security monitoring in a computer network has a packet sink with filtering and data analysis capabilities. The packet sink is a default destination for data packets having an address unrecognized by the network routers. At the packet sink, the packets are filtered and statistical summaries about the data traffic are created. The packet sink then forwards the data to a monitor, the information content depending on the level of traffic in the network.

17 Claims, 8 Drawing Sheets

U.S. PATENT DOCUMENTS

2003/0084186 A1* 5/2003 Yoshizawa et al. .......... 709/238
2004/0068577 A1* 4/2004 Ruutu ........................ 709/236

OTHER PUBLICATIONS

Robbins, Royce. "Distributed Intrusion Detection Systems: An Introduction and Review" (Jan. 2002) SANS Institute.*

Haig, Leight. "LaBrea—A New Approach to Securing our Networks" (Mar. 2002). SANS Institute.*

S. hanks, Netsmith ltd., T. Li, D. Farinacci, P. Traina, Cisco Systems. "RFC 1701: Generic Routing Encapsulation (GRE)" (Oct. 1994) Networking Working Group.*

Stoltenberg, Sverre. "LaBrea-stats.py" (Sep. 2001) Source avaliable at http://people.opera.com/sverrest/LaBrea/LaBrea-stats.py.html—Summary avaliable at http://people.opera.com/sverrest/LaBrea/.*

* cited by examiner

FORWARDING TABLE
300

| DESTINATION IP PREFIX | NEXT HOP ROUTER |
|---|---|
| 17 | R2 |
| 29 | R3 |
| 16 | R2 |
| * (ANY) | FLYTRAP (PACKET SINK) |
| | |
| | |

METHOD AND APPARATUS FOR CAPTURING AND FILTERING DATAGRAMS FOR NETWORK SECURITY MONITORING

BACKGROUND OF THE INVENTION

Computer networks are vulnerable to a number of types of attacks and compromises to security. Intruders attempt to break into networks in order to cause damage or to steal data. Network security can also be compromised by a virus or a worm, for example, deliberately placed in the network or as part of a file downloaded by a legitimate user. Any of these network invaders, intruders, viruses, or worms can degrade network performance by, for example, creating packet storms, can compromise network edge security by exposing critical internal IP addresses and can attempt to infect other hosts both inside and outside the private network.

A particularly difficult network security problem is the trojaned host. A trojaned host is a network node that is not secured properly because it is, for example, not running the latest anti-virus software update or perhaps is not running anti-virus software at all. Another way a node on the network can become a trojaned host is when the node has a defective firewall. The damage to a network, such as a private corporate network, that can be accomplished by a trojaned host can be extensive.

The basic goals of a network security system are to keep data and access secure while minimizing the consumption of network resources. A number of different types of network security systems have been developed in an attempt to accomplish this basic goal. Ideally, a network security system provides three aspects of security. That is, a network security system prevents, or at least hinders, intrusions to the network; the network security system also detects intrusions when prevention fails; and finally, the network security system responds to security failures.

Currently existing solutions to network security include a first network security system for a private network in which the routers are configured as a default-free routing zone. In other words, the routers do not know how to forward packets addressed to nodes outside the private network. In some arrangements of the first network security system, some nodes on the network, such as a web (HTTP) proxy or a SOCKS proxy, are configured to gateway traffic addressed to restricted-access data centers and also traffic destined for the public Internet. The gatewaying approach has the benefit of the ability to apply application-level security policies. This first network security system is referred to as the "no-default-routes and restrictive gateways" security design. This design has the advantages of (1) preventing unauthorized traffic to the Internet; (2) preventing unauthorized traffic from consuming internal network resources or border/firewall capacity; and (3) preventing penetrated internal nodes from easy wide-area network exploration within the private network.

In a second prior art network security system, some of the nodes on the private network are configured to gateway data traffic in a manner similar to the first network security system. The routers in the private network, however, contain default routes that lead to the network perimeter. At the perimeter, there are firewalls implementing extremely restrictive packet filters. This approach often involves multiple layers of firewalls around the gateway machines. This second network security system is referred to as the "normal restrictive gateways" security design. This system has the advantages of (1) preventing unauthorized traffic to the Internet (like the system described above) and (2) detecting unauthorized traffic attempts at the perimeter.

Some currently implemented network security systems are primarily detection systems rather then prevention systems. An example of a detection system for network security is a honeypot. A honeypot is a system configured specifically to be probed, attacked, or compromised, usually for the purpose of the detection of unauthorized activity in a network or in a network node. Examples of honeypots are systems that emulate other systems, systems that emulate known vulnerabilities, and systems that create jailed environments.

A honeynet is a network configured to be probed or compromised for the purpose of detection of unauthorized activity. Generally, a honeynet is used as a research tool. The honeynet typically sits behind a firewall where all inbound and outbound data is contained, captured and controlled. This captured information is then analyzed to learn the tools, tactics, and motives of network attackers.

SUMMARY OF THE INVENTION

Current network security technology does not provide comprehensive protection for computer networks. For example, neither the no-default-routes and restrictive gateways security system nor the normal restrictive gateways network security system described above combine all four advantages of preventing unauthorized traffic to the Internet, preventing unauthorized traffic from consuming internal network resources or border/firewall capacity, preventing penetrated client machines from easy wide-area network exploration, and detecting unauthorized traffic attempts at the network perimeter. In fact, it is rather difficult to build a system combining all four of these advantages. If there are default routes to the perimeter, then unauthorized traffic can saturate the internal corporate WAN (as in for example, CodeRed virus probing). In this type of system, however, the perimeter firewalls receive the unauthorized traffic and can analyze it at least while the network stays up. If there are no default routes leading to the perimeter, then the perimeter firewalls do not see most unauthorized traffic attempts, particularly those initiated by compromised machines. So, the "bad" data packets resulting from a security breach cannot do further damage because they are not forwarded through the network, but these data packets are also not analyzed because the data packets are discarded at the router. Embodiments of the present invention significantly overcome such deficiencies and provide a network security system that detects a breach of security and provides data for analysis and cure of the breach even in cases where network resources are heavily taxed as a result of the security problem.

The network security system, also referred to as a "flytrap", according to principles of the present invention, includes a packet sink having a filter, data encapsulation capability and the capability of gathering statistics about suspect data packets. The packet sink receives by default suspicious data packets and filters the suspicious data packets. The network security system transmits the captured traffic and also data about the suspicious data packets to a monitor for analysis by a central monitoring system even under conditions where a virus or worm is attempting to overload the network. The network security system can be paired with a router as a separate appliance or it can be a component of the router. In a further embodiment of the system, a plurality of network security systems having packet sinks are distributed throughout the network. In addition to improving network security, a further advantage of the invention is a reduction in network traffic because the filtering in the network security systems helps to reduce actual traffic in the network.

Similar to a honeypot, the flytrap collects packets. In one embodiment, a plurality of flytraps are distributed throughout the network. In another embodiment, the flytrap is implemented as a component of the router, either a software component or a hardware component.

The flytrap has some limited routing functionality. The flytrap peers with a nearby router using standard routing protocols. By doing so, the flytrap advertises to the router that it is a low cost route to the network perimeter. When the flytrap receives any packet, it processes that packet through a filtering process. If the filtering process accepts the packet, the packet is encapsulated and transmitted to a destination address M, typically the address of a type of monitor.

In one embodiment of the invention, the filter filters on the characteristics of bandwidth and size of packets. For example, the filter might be configured by a small number of packet filter rules of the form: size N, truncate at K, limit P pps and B bps, meaning that received packets of size N or greater shall be truncated to their first K bytes, and only P packets per second and B bits per second of such material shall be accepted for retransmission.

The flytrap has at least one network interface having the capability of providing that the filtered packets, when encapsulated and retransmitted to the monitor, a high likelihood of reaching the monitor even when the network is overloaded. Examples of packet protocols used by such a network interface are MPLS or VLAN. Further, the network can be provisioned so that the interface, the MPLS circuit, or VLAN is provided with higher priority or guaranteed transport capacity to the monitor. In an alternative embodiment of the invention, the goal of getting data from the flytrap to the monitor is achieved through the use of RSVP on the path from flytrap to the monitor.

The filtering rules of the flytrap filter implement the goal of forwarding a bandwidth-limited arbitrary subset of the data traffic received by the flytrap to the monitor. Generally, the traffic arriving at the flytrap will be unauthorized traffic. A bandwidth limit is set in the flytrap in order to avoid unauthorized traffic from consuming network capacity.

A statistical module is also included in the flytrap for logging and data collection purposes. The flytrap creates statistical summaries which are also forwarded to the monitor, as will be described below.

The monitor, in one embodiment of the invention, is a reporting site. In another embodiment of the invention, the monitor is a honeypot implementation using known deception-based approaches to respond to the unauthorized traffic, encouraging the unauthorized traffic, thereby learning more details about the unauthorized traffic or its source (infected machine or user, virus type, etc.).

The flytrap, according to principles of the invention brings the benefits of the honeypot intruder monitoring system to a distributed network cost effectively, without introducing the risk of permitting unauthorized traffic to consume large amounts of WAN bandwidth within a private network. In the embodiment where the monitor is a reporting site but not a full-fledged honeypot, the approach described here can provide a cost-effective early warning system for virus (or rather worm) infected machines, again without providing true default routes in the internal network with the consequent risks and possible bandwidth costs.

More specifically, embodiments of the invention provide methods and apparatus for a network security monitoring system in a computer network that provides a default path for suspect data packets. The packets transmitted over the default path are captured, filtered and the filter packets are transmitted to a network monitor.

In one embodiment of the invention, the step of providing a default path further comprises advertising a low-cost network edge route to a network router.

In another embodiment of the invention, the step of filtering includes implementing a bandwidth limit on the packets received at the network security monitoring system. In another embodiment of the invention, the step of filtering includes filtering based on packet size.

In another embodiment of the invention, the network monitoring system transmits packets to the monitor over a tunnel. In another embodiment of the invention, the network monitoring system transmits packets to the monitor by assigning a priority to the packets transmitted to the monitor.

In another embodiment of the invention, the monitor is a reporting site. In another embodiment of the invention, the monitor is a honeypot.

In another embodiment of the invention, the method further includes the steps of determining statistical information about the data packets and forwarding the statistical information in statistical summaries to the monitor.

In another embodiment of the invention, the network monitoring system is implemented in a router and includes the step of establishing a default destination in the routing table of the router.

BRIEF DESCRIPTION OF THE DRAWINGS

The foregoing and other objects, features and advantages of the invention will be apparent from the following description of particular embodiments of the invention, as illustrated in the accompanying drawings in which like reference characters refer to the same parts throughout the different views.

FIG. 4 is a router forwarding table according to principles of the present invention;

DETAILED DESCRIPTION

A security monitoring system in a computer network includes a packet sink with filtering and data analysis capabilities. The packet sink is a default route in the network for those packets addressed to destinations unknown to the network routers. The security monitoring system advertises itself as a low cost route to the network edges by peering with the network routers. Typically bad data traffic resulting from a network intrusion is sent to the network edges. This is due to the presumption on the part of routers that traffic with a destination address not matching any entry in the router forwarding tables is bound for a destination outside the network. Therefore, establishing a low cost default route to the network edges has a high probability of collecting bad data traffic when there is a network intrusion. The packet sink filters the received packets using at least of several characteristics including bandwidth and packet size. The packet sink also creates statistical summaries about the received packets such as source address, destination address, port numbers, and packet size.

The packet sink forwards information resulting from the packet collecting, filtering, and statistical summaries to a monitoring system ("monitor") capable of taking action to protect the network. The information form and content depends on the traffic load on the network. When the traffic to the packet sink is relatively light, the packet sink forwards the packets themselves to the monitor. When data traffic is heavy, the packet sink forwards only portions of the packets such as the packet headers to the monitor. When the data traffic is very heavy, the packet sink forwards the statistical data and selected packets. In this way, the packet sink is able to send data to the monitor even in cases where a virus, for example, is attempting to flood the network with, for example, a packet storm, in an attempt to overload network resources.

Figure 1:
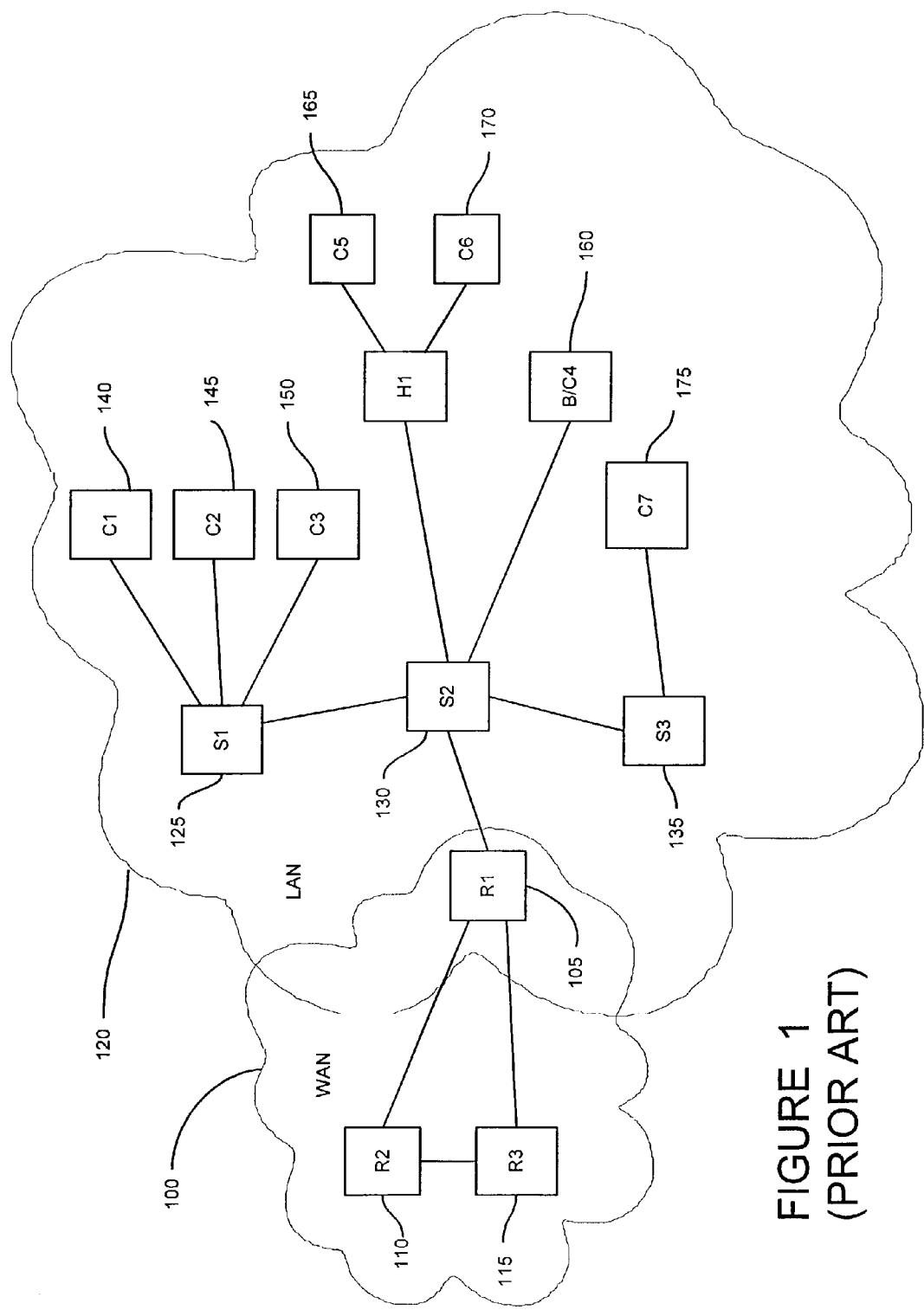
FIG. 1 is a block diagram of a prior art local area network in which there is an infiltrated client machine.

FIG. 1 is a block diagram of a prior art wide area network (WAN) 100 connecting two data communications devices, routers R2 110 and R3 115, and a LAN 120. The LAN 120 is connected to the WAN 100 by a third router, R1 105. In addition to router R1 105, the LAN 120 has a plurality of other data communications devices. The LAN 120 has three switches, S1 125, S2 130 and S3 135 networked together inside the LAN 120. S1 125 has three clients, C1 140, C2 145, and C3 150. S2 130 has a hub, H1 155 and a client, C4 160. H1 has two clients, C5 165, C6 170. S3 has one client, C7 175.

The security of one of the clients, C4 160, in the LAN 120 has been compromised. For example, C4 160 has been infected by a computer virus is flooding the network with data traffic or has been made accessible to an unauthorized party attempting to access private data stored in the network. The LAN 120, in this configuration, has limited defenses against C4 160 performing unauthorized acts such as sending unauthorized traffic outside the LAN 120, or consuming internal LAN resources or consuming border/firewall capacity.

Figure 2:
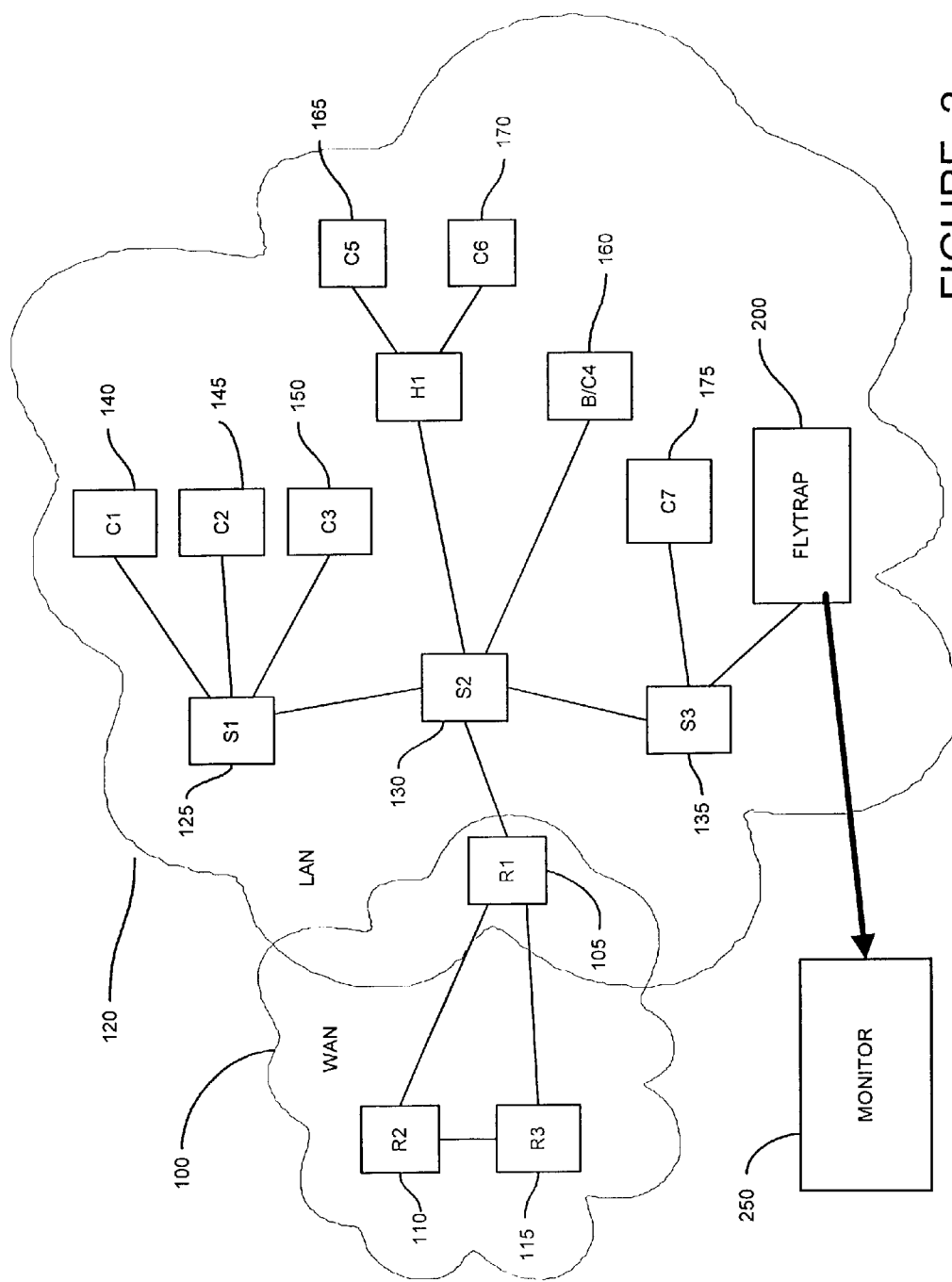
FIG. 2 is a local area network including a flytrap system according to principles of the present invention.

FIG. 2 is a block diagram of the wide area network (WAN) 100, of FIG. 1, connecting two routers, R2 110, and R3 115 and the LAN 120 where the LAN 120 has a network security system 200, also referred to as a packet sink or a flytrap, operating according to principles of the present invention. As in FIG. 1, the LAN 120 is connected to the WAN 100 by the third router, R1 105. The LAN 120 has three switches, S1 125, S2 130 and S3 135. S1 125 has three clients, C1 140, C2 145, and C3 150. S2 130 has a hub, H1 155 and a client, C4 160. H1 has two clients, C5 165, C6 170. S3 has one client, C7 175. The flytrap 200 is associated with S3 135. The flytrap 200 could alternately be attached to the router R1 105. A monitor 250 for network security is connected to the flytrap 200. The monitor 250 receives data from the flytrap 200 as will be described below. In this figure, the monitor 250 is outside the LAN 120, however, in alternative embodiments, the monitor 250 is located within the LAN 120. The monitor 250, in one embodiment of the invention, is a reporting site. In another embodiment of the invention, the monitor 250 is a honeypot implementation using known deception-based approaches to respond to the unauthorized traffic, encouraging the unauthorized traffic, thereby learning more details about the unauthorized traffic or its source (infected machine or user, virus type, etc.).

In general, the invention leverages off of a LAN's mechanism for handling unknown packets, i.e., suspect packets having addresses unknown to the LAN routers. In conventional networks, the network devices are typically configured to steer such traffic to the network edges, e.g., along low-cost default pathways to gateways, firewalls, and other edge devices. This happens because routers presume that a packet with an address not matching any of the addresses in the routing tables is bound for a destination outside the network, e.g., outside the LAN 120. Unfortunately, this conventional approach also tends to cause excessive traffic and unnecessary network congestion along the network edges as well.

In contrast to the above-described conventional networks, the data communications devices of the LAN 120 of FIG. 2 (i.e., the router R1 105, the switches S1 125, S2 130, S3 135, etc.) are pre-configured to send packets having unknown destination addresses, i.e., suspect packets, to the flytrap 200 by default. The flytrap 200 gathers these suspect packets and sends them and/or statistical summaries of the suspect packets to the monitor 250. In turn, the monitor 250 (e.g., a central monitoring/administrative system) can analyze the suspect packets and/or statistical summaries, and can take action (e.g., disable further propagation of the suspect packets within the LAN 120).

In one arrangement, the flytrap 200 advertises itself inside the LAN 120 as an efficient, i.e., low-cost, route to the WAN 100 in order to establish a default path to the flytrap 200. Examples of routing protocols which are suitable for use by the flytrap 200 include Open Shortest Path First (OSPF), and Intermediate Systems to Intermediate System routing protocol (IS-IS). As a result, the switches 125, 130, 135, hub 155 and router 105 of the LAN 120 enter the flytrap 200 into their routing tables as the most efficient path to the WAN 100.

In another arrangement, the LAN 120 network configuration edits the routing tables of the various nodes to establish the default path. Further details of the invention will now be described with reference back to the example explained above in connection with FIG. 1.

Suppose that the security of the client C4 160 of FIG. 2 has been compromised and sends bad packets onto the LAN 120 as a result of a virus infection in a manner similar to that described earlier for the client C4 160 of FIG. 1. In particular, suppose that the client C4 160 of FIG. 2 sends out an abundance of packets addressed to a node unknown to the data communications devices. As described above, the data communications devices steer these packets toward the flytrap 200. The flytrap 200 gathers these packets and communicates with the monitor 250 to prevent the virus infection from spreading (e.g., causes the monitor 250 to disable further distribution of packets from the client C4 160).

Figure 3:
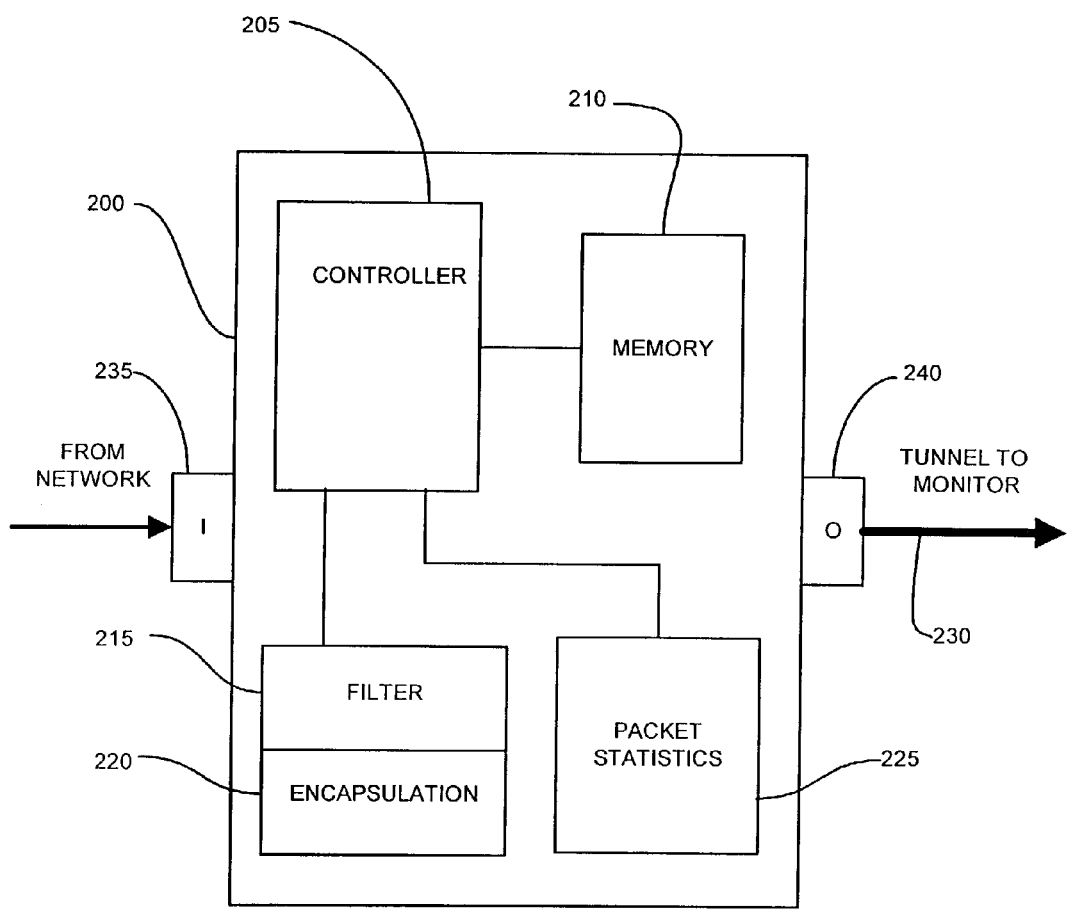
FIG. 3 is a block diagram of one embodiment of the flytrap system.

FIG. 3 is a block diagram of one embodiment of the flytrap 200. The flytrap 200 has a controller 205 connected to a memory 210, a filter module 215, an encapsulation module 220 and a packet statistics module 225. The flytrap 200 is a router-like appliance with limited routing functionality. The flytrap 200 receives packets at an input 235 from the network 120 by peering with a nearby router using standard routing protocols. The flytrap 200 establishes at an output 240 a tunnel 230 to the monitor 250 through which the flytrap 200 sends a report message 520 (shown in FIG. 5) containing network security information. A tunnel applies encapsulation and encryption protocols in order to send data through a virtual network using the connections of another, physical network.

In operation, the flytrap 200 advertises to the router 105 as a low-cost route to the WAN 100. The router 105 then enters into its routing table the route to the flytrap 200 as a default route to the WAN 100. Whenever the router 105 receives a data packet having an address that does not match any other entry in the routing table, the router 105 will send the data packet to the flytrap 200. When the flytrap 200 receives a packet, the flytrap 200 processes that packet through the filter module 215 that applies certain filtering criteria. If the filter module 215 accepts the packet, the encapsulation module 220 encapsulates the packet, using Generic Routing Encapsulation (GRE), for example. The flytrap 200 transmits the encapsulated packet to destination address M, typically the address of the monitoring system 250.

The filter module 215 applies filter criteria important in ensuring good traffic flow to the monitor 250. The flytrap 200 buffers filtered packets in the memory 210 for transmission to the monitor 250 as described below. Filtering criteria includes, but is not limited to the rate, quantity, bandwidth, and size of packets. The filtering rules of the flytrap filter 215 implement the goal of forwarding a bandwidth-limited arbitrary subset of the data traffic received by the flytrap 200 to the monitor 250. Generally, the traffic arriving at the flytrap 200 will be unauthorized traffic. A bandwidth limit is set in the flytrap 200 in order to avoid unauthorized traffic from consuming network capacity.

For example, the filter 200 is configured, in one embodiment, by a small number of packet filter rules of the form: size N, truncate at K, limit P pps and B bps, meaning that received packets of size N or greater shall be truncated to their first K bytes, and only P packets per second and B bits per second of such material shall be accepted for retransmission.

Through the filtering process, the flytrap 200 forwards information to the monitor 250 wherein the content of the information depending on the flow of traffic in the LAN 120. If the traffic is relatively light, the flytrap 200 sends encapsulated packets to the monitor 250. If the traffic is heavy, the filter module 215 truncates the packets and sends the encapsulated truncated packets to the monitor 250. If the traffic is very heavy, the flytrap 200 sends the statistics gathered by the packet statistics module 225 and forwards the statistics and selected packets to the monitor 250.

The flytrap 200 has at least one network interface having the capability of providing that the filtered packets, when encapsulated and retransmitted to the monitor 250, a high likelihood of reaching the monitor 250 even when the network is overloaded. Examples of packet protocols used by such a network interface are MPLS or VLAN. Further, the network can be provisioned so that the interface, the MPLS circuit, or VLAN is provided with higher priority or guaranteed transport capacity to the monitor 250. In an alternative embodiment of the invention, the goal of getting data from the flytrap 200 to the monitor 250 is achieved through the use of RSVP on the path from flytrap 200 to the monitor 250.

FIG. 4 is a router forwarding table 300, of the router R1 105 of FIG. 2, having a default path to the flytrap 200 (also called the packet sink) according to principles of the present invention. The forwarding table entries are destination IP prefixes 305 and associated next hop routers 310. The forwarding table 300 has a default destination 315 for those IP addresses that do not have another match in the forwarding table 300. The default destination 320 is the packet sink, or flytrap, 200. That means, any packet to be sent to an unknown address is forwarded to the flytrap system 200 for capture and analysis. In one embodiment of the invention, the default destination is added to the routing table when either the flytrap 200 advertised itself to the router as a low-cost route to the WAN. In another embodiment of the invention, the router is configured with this entry.

Figure 5:
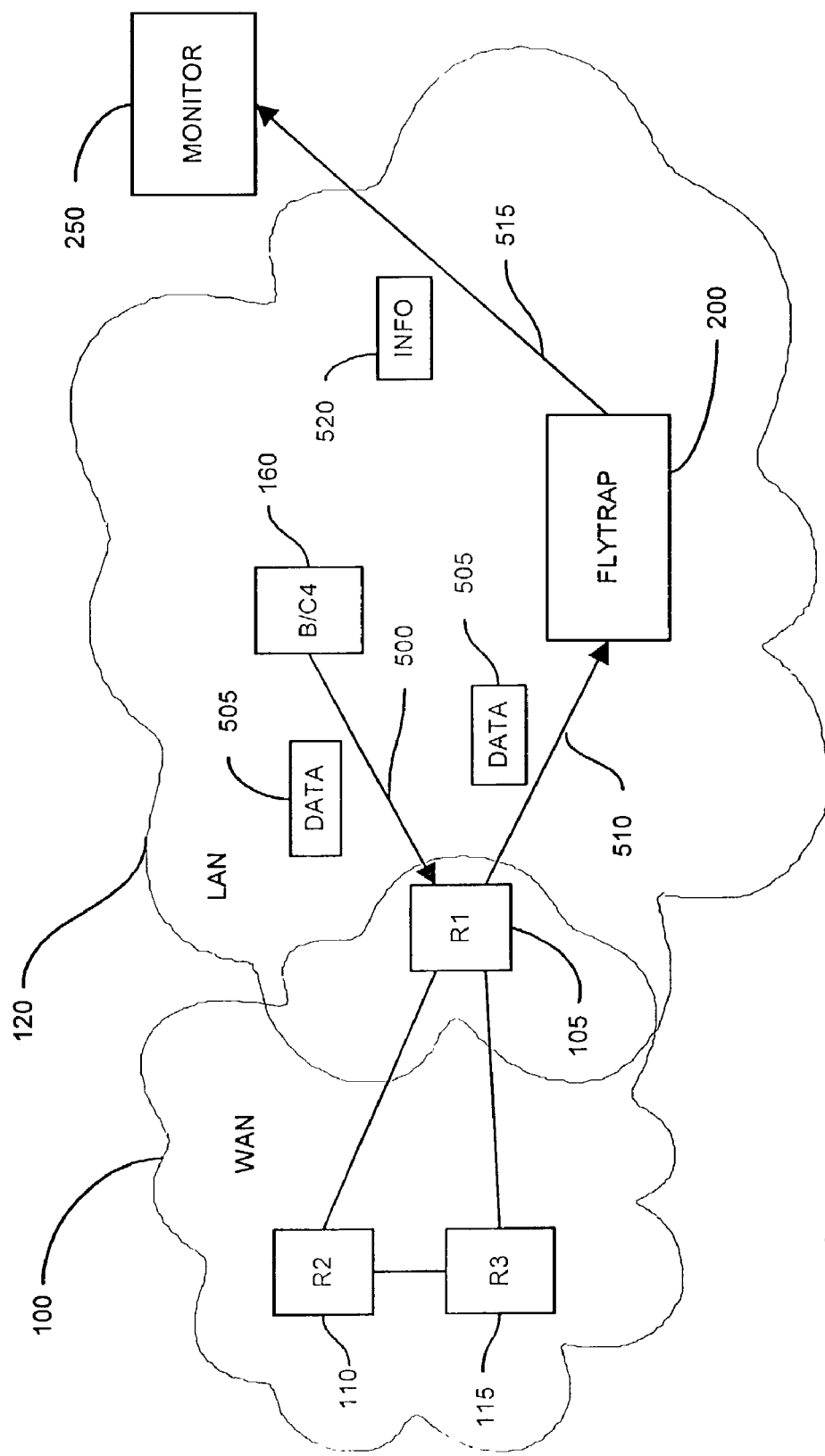
FIG. 5 is a part block diagram, part flow diagram of a strange packet captured by the flytrap system of FIG. 2.

FIG. 5 is a part block diagram, part data flow diagram for a suspected "bad" packet 505 through the LAN 120 of FIG. 2. As in FIGS. 1 and 2, the WAN 100 connects routers R2 110, and R3 115 and LAN 120. R1 105 is part of the LAN 120. The LAN 120 has a node, client C4 160 whose security has been compromised. The LAN 120 also has a flytrap 200 operating according to principles of the present invention. Outside of, but connected to the LAN 120 is a monitor system 250. In other arrangements, the monitor system 250 is part of the LAN. The monitor system 250 could also be located anywhere in the WAN 100 or it could be part of some other network.

In a first network transaction 500, the compromised node sends a bad packet 505 onto the LAN 120 and this packet 505 arrives at the router R1 105. The packet 505, typically, is addressed to an IP address unknown to the router R1 105. The router R1 105 has a routing table, similar to the forwarding table 300 of FIG. 4, having a default destination for packets having an unknown address. The default destination is the flytrap 200. In a second network transaction, 510, the router transfers the packet 505 to the flytrap 200. The flytrap 200 receives the packet, filters the packet and compiles statistics on the packet 505. In a third network transaction, 515, the flytrap 200 sends the report message 520 of network information to the monitoring system 250. The information 520, as described above with regard to FIG. 3, depends on the level of traffic and the filtering criteria applied by the filter module 215, the information can the encapsulated data packet, the portion of the packet, or packet statistics compiled by the flytrap 200.

Figure 6:
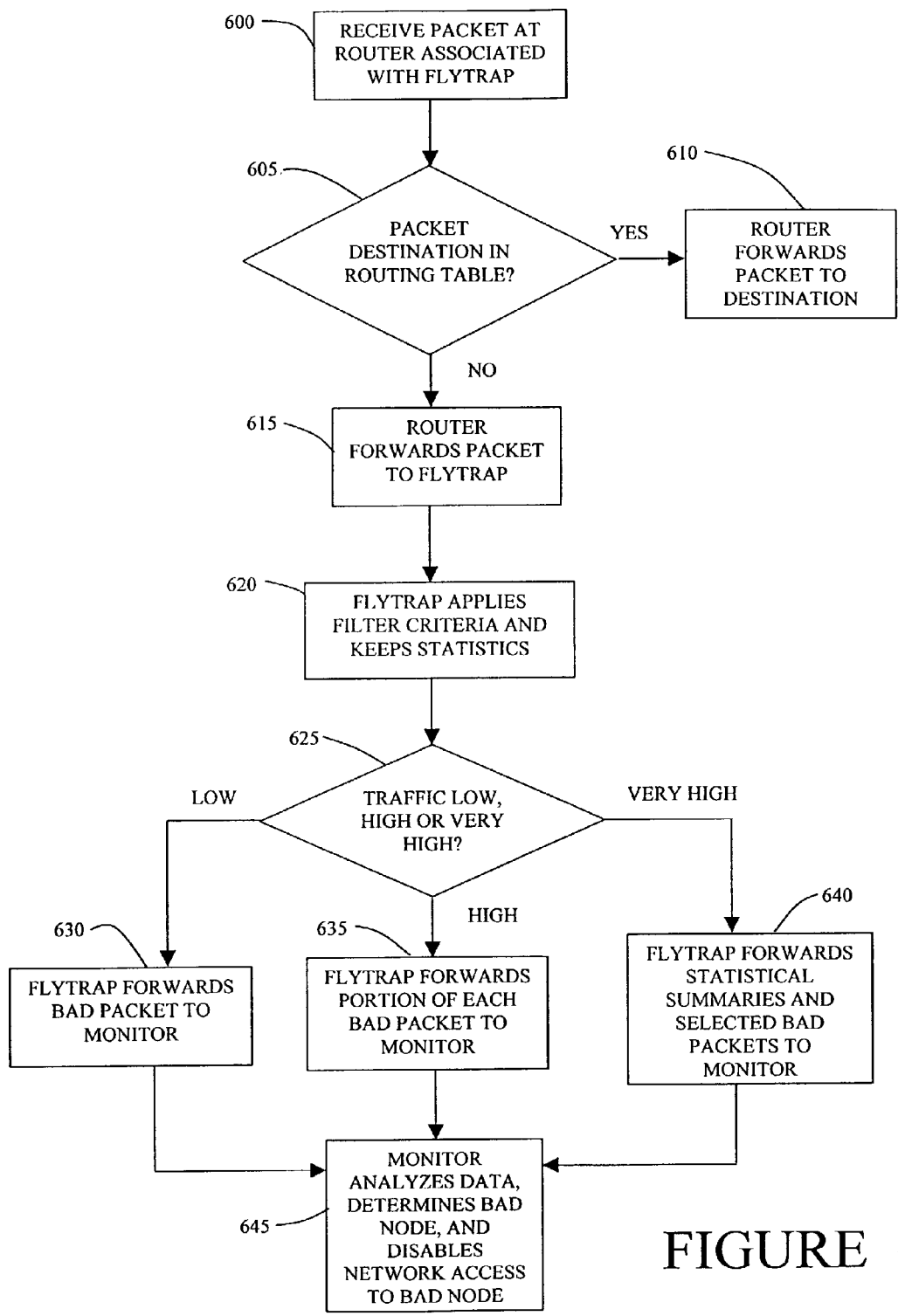
FIG. 6 is a flow chart of the process of the flytrap of FIG. 2.

FIG. 6 is a flow chart of the operation of a network including a packet sink/flytrap 200 according to principles of the invention. In step 600, the router 105 associated with the flytrap 200 receives a packet.

In step 605, the router 105 compares the packet destination with destinations in its router table.

If the router 105 has the packet destination in its routing table, step 610, the router 105 forwards the packet to that destination.

If the router 105 does not have the packet destination in its routing table, step 615, the router 105 forwards the packet to the flytrap 200.

In step 620, the flytrap 200 applies filter criteria according to the preset bandwidth limit and according to the level of traffic in the network. The flytrap 200 also compiles statistics about the data traffic received at the flytrap 200.

At step 625, the flytrap 200 filtered packets and other data to the monitor 250 depending on the level of traffic in the network, whether the data traffic is at a low level, a high level, or at a very high level.

In step 630, if the traffic is a low level, the flytrap 200 forwards filtered packets to the monitor 250.

In step 635, if the traffic is at a high level, the flytrap 200 forwards a portion, such as headers only, of the received packet to the monitor 250.

In step 640, if the traffic is at a very high level, the flytrap 200 forwards statistical summaries to the monitor 250 along with some sample packets.

In step 645, the monitor 250 receives the information from the flytrap 200. In one embodiment of the system, the monitor 250 is a reporting device and it reports on the basis of the flytrap information that the network has a problem. In another embodiment of the system, the monitor 250 performs analysis on the data received from the flytrap 200, locates the bad node in the network and initiates action to protect the network. The monitor 250, in a first arrangement of the invention, commands the router R1 105 and/or the switch S2 130 to disable LAN 120 access for the compromised client C4 160. In a second arrangement of the invention, the monitor 250 commands the router R1 105 to implement a content-routing protocol such as Web Cache Communication Protocol (WCCP) of Cisco Systems, Inc. of San Jose, Calif., to direct additional traffic generated on the LAN 105, or by the client C4 160 in particular, to the flytrap 200.

Figure 7:
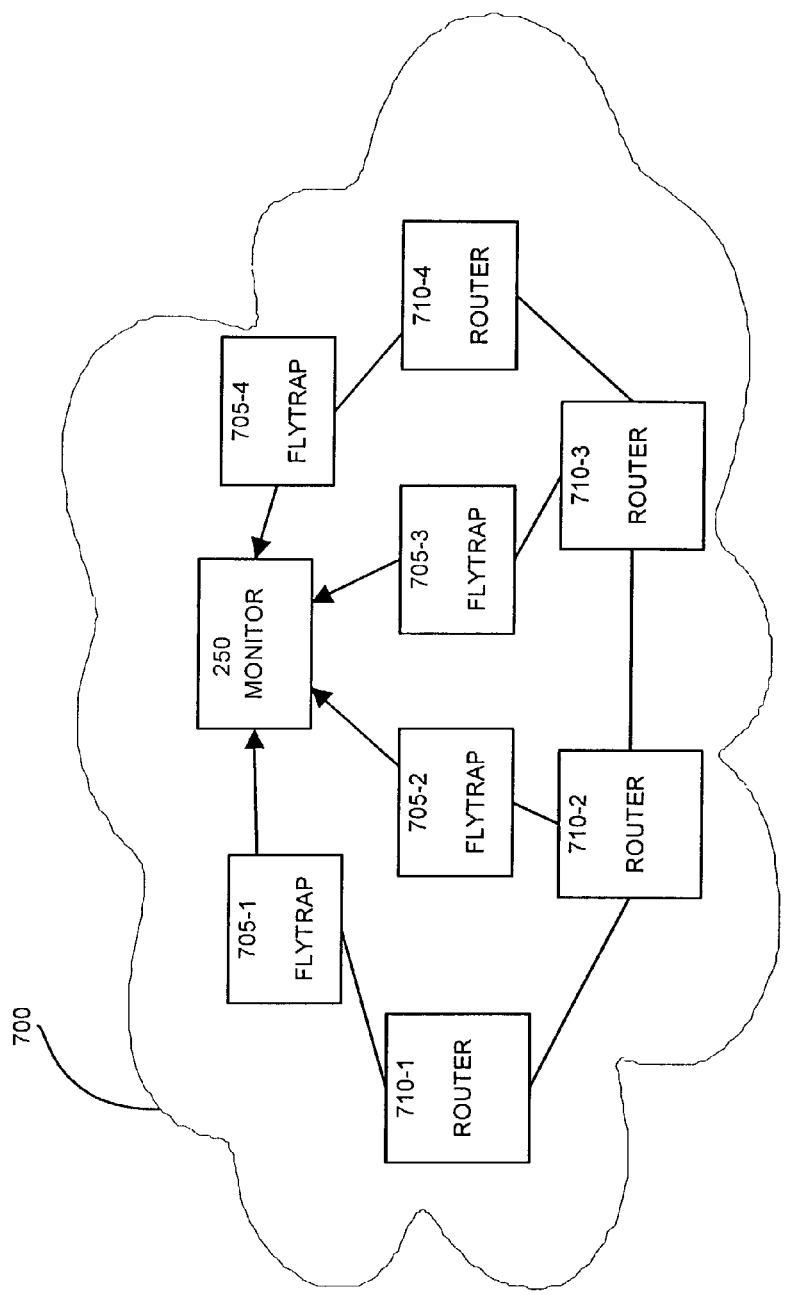
FIG. 7 is a computer network having a plurality of flytrap systems according to principles of the present invention.

FIG. 7 shows an alternate embodiment of the invention in which a network 700 has a plurality of distributed flytrap systems 705 and a monitor 250. In the network 700, each of the plurality of flytrap systems 705 is associated with one of a plurality of routers 710. In an alternate arrangement, the flytrap systems 705 is associated with other packet forwarding devices such as switches. Each router 710 forwards suspicious data traffic to its peer flytrap 705 and the flytraps 705 forward data as described above to the monitor 250. A distributed system such as the system shown in FIG. 7 is useful for providing a low-cost distributed security monitoring system to a plurality of LANs connected to a central site, for example.

In an alternative embodiment of the invention, a router in a content-routed network is configured with a bandwidth-limit filter for packets having unrecognized destinations. The router is further configured with default paths to a monitor 250. In a first arrangement, the default paths are tunnels to the monitor 250, using, for example, Generic Routing Encapsulation (GRE). In a second arrangement, the default paths are implemented using GRE and Web Cache Communication Protocol (WCCP), developed by Cisco Systems, of San Jose, Calif. WCCP specifies interactions between one or more routers (or Layer 3 switches) and one or more web-caches. WCCP establishes and maintains the transparent redirection of selected types of traffic flowing through a group of routers. The selected traffic is redirected to a group of web-caches with the aim of optimizing resource usage and lowering response times. In this arrangement of the invention, the web-caches are monitors for network intrusion. This alternative embodiment has the advantage of being a lower-cost alternative to other embodiments described above.

In another embodiment of the invention, the flytrap's packet filtering module, whether implemented as a separate appliance or as a module within the router, uses layer 4 header information and maintains a limited amount of state data about active connections.

In another embodiment of the invention, for high-load and virus-infestation situations, the flytrap 200 forwards some small amount of information about each unauthorized intrusion attempt, for example, the syn packet. The flytrap 200 also forwards all the packets for some connections, so that more information can be gathered.

Figure 8:
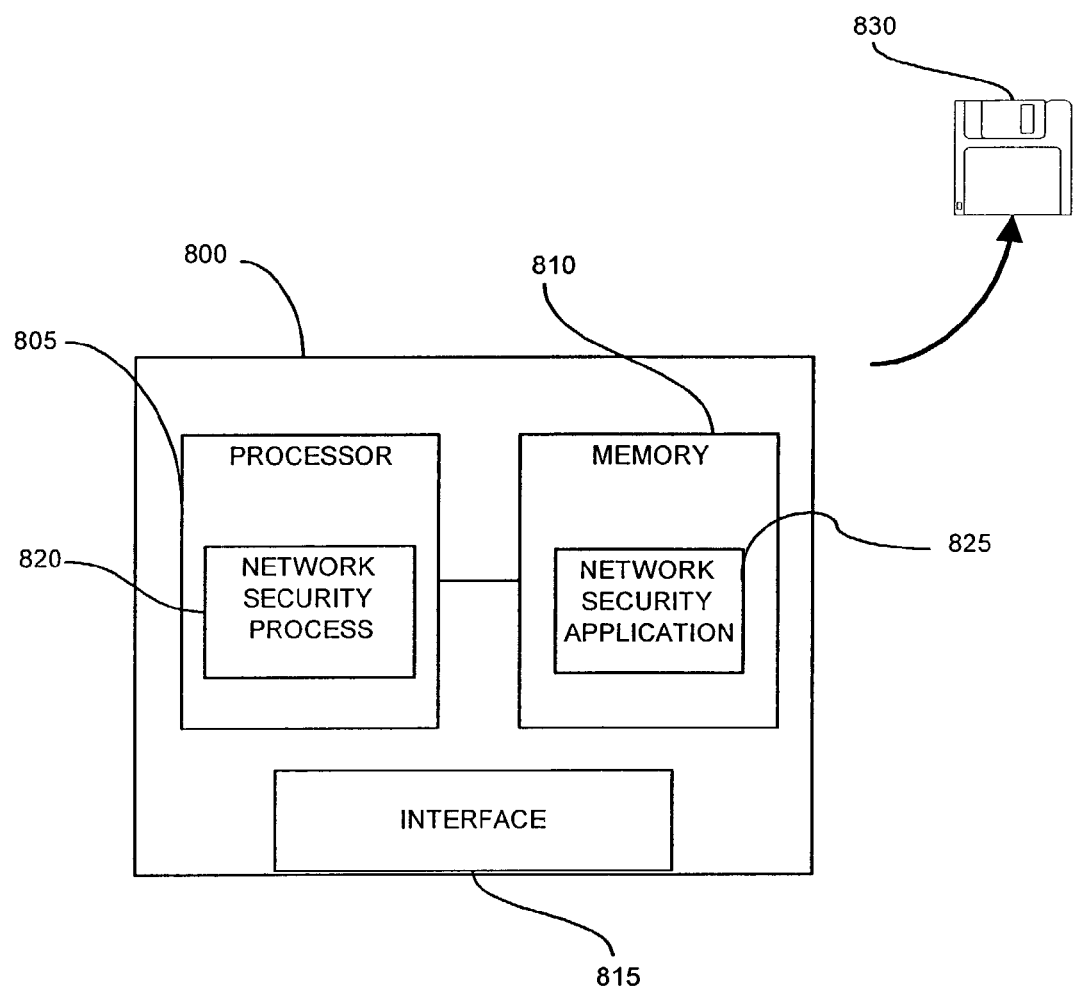
FIG. 8 is a block diagram of the flytrap of FIG. 1 implemented in processor and memory applications storable on a computer-readable medium.

FIG. 8 shows another embodiment of the invention in which the flytrap 200 is implemented as a processor running a software application. The application is installable from a computer-readable medium. In accordance with this embodiment and as shown in FIG. 8, a computer system 800 has a processor 805 connected to a memory 810. The computer system 800 further has a communications interface 815. The processor 805 executes a network security process 820 and the memory 810 stores the network security application 825. A program for the network security application 825 is stored in a readable format in a computer-readable medium 830.

During operation, the processor 805 performs the flytrap operations described above in connections with FIGS. 2-6. In particular, the processor 805, while executing instructions of the application 825, collects suspect packets from the LAN 120, filters the suspect packets and communicates its findings to the monitor 250.

The invention described above provides the benefits of preventing unauthorized traffic to the Internet, preventing unauthorized traffic from consuming internal network resources or border/firewall capacity, preventing penetrated client machines from easy wide-area network exploration, and detecting unauthorized traffic attempts at the network perimeter. By collecting suspect packets at a collection point in the network, i.e. the flytrap, the present invention prevents unauthorized traffic from being forwarded outside the local network and also reduces data congestion caused by, for example, network flooding from a virus. Further, the filtering of data and delivery techniques to the monitor improve intrusion detection and reporting so that steps can quickly be taken to secure the network.

The network type and configuration shown in FIGS. 1 and 2 are merely exemplary. Other network types and configurations are possible within the scope of the invention. Further, while data packets are described as the structure of data sent over the network, by way of example only, other types of datagrams (or data elements) such as cells and frames are possible within the scope of the invention.

Other embodiments of the invention include a computer system, such as a data communications device, computerized device, or other device configured with software and/or circuitry to process and perform all of the method operations noted above and disclosed herein as embodiments of the invention. In such embodiments, the device, such as a data communications device comprises at least one communications interface (e.g., a network interface), a memory (e.g., any type of computer readable medium, storage or memory system), a processor and an interconnection mechanism connecting the communications interface, the processor and the memory. In such embodiments, the memory system is encoded with a network security system that when performed on the processor, produces a process that causes the computer system to perform any and/or all of the method embodiments, steps and operations explained herein as embodiments of the invention. In other words, a computer, switch, router, gateway, network bridge, proxy device or other network device that is programmed or otherwise configured to operate as explained herein is considered an embodiment of the invention.

Other arrangements of embodiments of the invention that are disclosed herein include software programs to perform the method embodiment steps and operations summarized above and disclosed in detail below. As an example, a data communications device software control application, such as a data communications device operating system configured with a network security system that operates as explained herein is considered an embodiment of the invention. More particularly, a computer program product is disclosed which has a computer-readable medium including computer program logic encoded thereon that, when executed on at least one processor with a computerized device, causes the processor to perform the operations (e.g., the methods) indicated herein is considered an embodiment of the invention. Such embodiments of the invention are typically embodied as software, logic instructions, code and/or other data (e.g., data structures) arranged or encoded on a computer readable medium such as an optical medium (e.g., CD-ROM), floppy or hard disk or other a medium such as firmware or microcode in one or more ROM or RAM or PROM chips or as an Application Specific Integrated Circuit (ASIC). These software or firmware or other such configurations can be installed onto a computer system, data communications device or other dedicated or general purpose electronic device to cause such a device to perform the techniques explained herein as embodiments of the invention.

The embodiments of the invention may be implemented by computer software and/or hardware mechanisms within a data communications device apparatus. It is to be understood that the system of the invention can be embodied strictly as a software program, as software and hardware, or as hardware and/or circuitry alone. The features of the invention, as explained herein, may be employed in data communications devices and other computerized devices and/or software systems for such devices such as those manufactured by Cisco Systems, Inc. of San Jose, Calif.

It is to be understood that the above-described embodiments are simply illustrative of the principles of the invention. Various and other modifications and changes may be made by those skilled in the art which will embody the principles of the invention and fall within the spirit and scope thereof.

The invention claimed is:

1. A method for network security monitoring in a computer network, comprising the steps of:
   providing a default path in the computer network for suspect datagrams, the computer network configured as a Local Area Network (LAN);
   capturing suspect datagrams transmitted on said default path, the suspect datagrams generated by clients within the computer network the suspect datagrams having destination addresses that do not match any of the destination addresses located in routing tables of network routers within the LAN;
   filtering said captured suspect datagrams and transmitting said filtered datagrams to a network monitor wherein filtering said captured suspect datagrams comprises limiting a rate of the suspect datagrams to be transmitted to the network monitor, a quantity of suspect datagrams to be transmitted to the network monitor, a size of the suspect datagrams to be transmitted to the network monitor, and a bandwidth associated with the suspect datagrams to be transmitted to the network monitor;
   wherein said providing step further comprises advertising a low-cost network perimeter route to a network router such that said router enters said low-cost network perimeter route into a routing table as said default path,
   identifying, by the network monitor, a compromised client within the LAN based upon the filtered datagrams generated within the LAN and received by the network monitor, and
   disabling LAN access for the compromised client within the LAN to disable further propagation of the suspect datagrams within the LAN.

2. The method of claim 1 wherein said filtering step further comprises filtering based on Layer 4 header information.

3. The method of claim 1 wherein said step of transmitting includes the step of:
   sending said filtered datagrams through a tunnel to said network monitor to increase a likelihood of reception of said filtered packets by said network monitor.

4. The method of claim 1 further comprising the steps of:
   creating statistical summaries about said datagrams transmitted on said default path; and
   forwarding said statistical summaries to the network monitor.

5. The method of claim 1 wherein said method executes inside a network router and wherein said providing step further comprises the step of establishing a default destination in a routing table.

6. The method of claim 5, wherein said transmitting step further comprises the step of establishing a Generic Routing Encapsulation tunnel through which to transmit said filtered datagrams.

7. The method of claim 5, wherein said network monitor is a Web cache, and wherein said providing step further comprises the step of providing data traffic redirection using Web Cache Communication Protocol; and wherein said transmitting step further comprises establishing a Generic Routing Encapsulation tunnel through which suspect datagrams are redirected to the Web cache.

8. The method of claim 1 further comprising the step of maintaining state data of active connections.

9. The method of claim 1, wherein advertising a low-cost network perimeter route to the network router comprises advertising a low-cost network perimeter route of a Local Area Network (LAN) to the network router such that said router enters said low-cost network perimeter route into the routing table as said default path, the low-cost perimeter route configured as a network edge of the LAN.

10. The method of claim 1, wherein capturing suspect datagrams transmitted on said default path comprises capturing suspect datagrams transmitted on said default path, the suspect datagrams generated by a virus-infected client within the LAN.

11. The method of claim 1, wherein:
    identifying, by the network monitor, a compromised client within the LAN based upon the filtered datagrams generated within the LAN and received by the network monitor comprises analyzing the filtered datagrams to detect a breach of security of the LAN; and
    disabling LAN access for the compromised client within the LAN to disable further propagation of the suspect datagrams within the LAN comprises in response to detecting a breach of security of the LAN, disabling LAN access for the compromised client within the LAN to disable further propagation of the suspect datagrams within the LAN.

12. The method of claim 11, wherein transmitting said filtered datagrams to a network monitor comprises forwarding a first subset of the filtered datagrams to the network monitor when the computer network has a first traffic load and forwarding a second subset of the filtered datagrams to the network monitor when the computer network has a second traffic load, the first subset of the filtered datagrams being larger than the second subset of the filtered datagrams and the first traffic load being smaller than the second traffic load.

13. A network security system, comprising:
    means for providing a default path in a Local Area Network (LAN) for suspect datagrams, the suspect datagrams generated within the LAN;
    means for capturing datagrams transmitted on said default path within the LAN;
    means for filtering said captured datagrams and means for transmitting said filtered datagrams to a network monitor wherein means for filtering said captured suspect datagrams comprises means for limiting a rate of the suspect datagrams to be transmitted to the network monitor, a quantity of suspect datagrams to be transmitted to the network monitor, a size of the suspect datagrams to be transmitted to the network monitor, and a bandwidth associated with the suspect datagrams to be transmitted to the network monitor;
    wherein said means for providing further comprises means for advertising a low-cost network perimeter route to a network router such that said router enters said low-cost network perimeter route into a routing table as said default path,
    wherein the network monitor comprises means for identifying a compromised client within the LAN based upon the filtered datagrams generated within the LAN and received by the network monitor, and
    means for disabling LAN access for the compromised client within the LAN to disable further propagation of the suspect datagrams within the LAN.

14. The network security system of claim 13 wherein said means for transmitting further comprises means for sending said filtered datagrams through a tunnel to said network monitor to increase a likelihood of reception of said filtered packets by said network monitor.

15. The network security system of claim 13, further comprising:
- means for creating statistical summaries about said datagrams transmitted on said default path; and
- means for forwarding said statistical summaries to the network monitor.

16. The network security system of claim 13 wherein the network security system is implemented in a router and wherein said providing step further comprises means for establishing a default destination in a routing table.

17. A computer program product having a computer-readable medium including computer program logic encoded thereon that, when performed on a computer system directs the computer system to perform the method of:
- providing a default path in a network for suspect datagrams, the computer network configured as a Local Area Network (LAN);
- capturing suspect datagrams transmitted on said default path, the suspect datagrams generated by clients within the computer network, the suspect datagrams having destination addresses that do not match any of the destination addresses located in routing tables of network routers within the LAN;
- filtering said captured datagrams and transmitting said filtered datagrams to a network monitor wherein filtering said captured suspect datagrams comprises limiting a rate of the suspect datagrams to be transmitted to the network monitor, a quantity of suspect datagrams to be transmitted to the network monitor, a size of the suspect datagrams to be transmitted to the network monitor, and a bandwidth associated with the suspect datagrams to be transmitted to the network monitor;
- wherein providing further comprises advertising a low-cost network perimeter route to a network router such that said router enters said low-cost network perimeter route into a routing table as said default path,
- identifying, by the network monitor, a compromised client within the LAN based upon the filtered datagrams generated within the LAN and received by the network monitor, and
- disabling LAN access for the compromised client within the LAN to disable further propagation of the suspect datagrams within the LAN.

* * * * *